United States Patent
Khan

(10) Patent No.: US 8,306,057 B1
(45) Date of Patent: Nov. 6, 2012

(54) METHOD AND SYSTEM FOR PROVIDING PRESENCE INFORMATION RELATED TO A COMMUNICATIONS NETWORK

(75) Inventor: Safwan A. Khan, Gainesville, VA (US)

(73) Assignee: Nextel Communications, Inc., Reston, VA (US)

( * ) Notice: Subject to any disclaimer, the term of this patent is extended or adjusted under 35 U.S.C. 154(b) by 936 days.

(21) Appl. No.: 11/678,371

(22) Filed: Feb. 23, 2007

(51) Int. Cl.
*H04J 3/16* (2006.01)

(52) U.S. Cl. .................... 370/466; 370/401; 709/201

(58) Field of Classification Search .......... 370/401, 370/466–468; 709/204; 455/456.1
See application file for complete search history.

(56) References Cited

U.S. PATENT DOCUMENTS

| | | | |
|---|---|---|---|
| 6,104,931 A | 8/2000 | Havinis et al. | |
| 6,600,928 B1 | 7/2003 | Ahya et al. | |
| 6,873,620 B1 * | 3/2005 | Coveley et al. | 370/395.31 |
| 6,904,023 B2 * | 6/2005 | Albal et al. | 370/260 |
| 7,142,856 B2 | 11/2006 | Barrow | |
| 7,359,731 B2 * | 4/2008 | Choksi | 455/552.1 |
| 2004/0190535 A1 * | 9/2004 | Albal et al. | 370/401 |
| 2005/0038836 A1 * | 2/2005 | Wang | 707/204 |
| 2005/0107100 A1 | 5/2005 | Gustafsson et al. | |
| 2005/0227705 A1 | 10/2005 | Rousu et al. | |
| 2005/0232184 A1 * | 10/2005 | Borella | 370/328 |
| 2005/0235056 A1 * | 10/2005 | Chen et al. | 709/223 |
| 2006/0031368 A1 | 2/2006 | deCone | |
| 2007/0165554 A1 * | 7/2007 | Jefferson et al. | 370/315 |

* cited by examiner

*Primary Examiner* — Ayaz Sheikh
*Assistant Examiner* — Mounir Moutaouakil

(57) ABSTRACT

A method and system for providing presence information related to a communications network is provided. A first presence information message is received from a first network element of the communications network at a presence aggregator of the communications network, where the first network element utilizes a first communications protocol. A second presence information message is received from a second network element of the communications network at the presence aggregator, where the second network element utilizes a second communications protocol. The presence aggregator translates the first and second presence information messages into a standardized protocol and sends the translated first and second presence information messages to a presence server coupled to the communications network.

21 Claims, 2 Drawing Sheets

METHOD AND SYSTEM FOR PROVIDING PRESENCE INFORMATION RELATED TO A COMMUNICATIONS NETWORK

FIELD OF THE INVENTION

The present invention relates generally to the field of telecommunications, and in particular to presence information related to a communications network.

BACKGROUND OF THE INVENTION

Cellular communications systems may provide interconnect and/or dispatch voice communication services and/or data communication services. Interconnect voice communication services are those typically provided by most cellular carriers as circuit-switched communications. Dispatch communication services are commonly known as a "walkie-talkie" type of call, such as provided by Nextel Communications, Inc. and identified by the trade names Push-To-Talk (PTT) or Direct Connect. The popularity of dispatch calls, and thus the popularity of hybrid networks that can support communications in multiple formats, is ever expanding and this increase in popularity has created a demand for more features to be associated with these types of calls and networks.

Currently, it is desired that presence information regarding communications networks and individual subscribers to the networks be available for providing such information to another party/communications device that may desire this information. Examples of presence information are whether or not the subscribers are registered in the network, involved in a dispatch call, involved in a packet data session, and/or involved in a interconnect call. As the subscriber base of the telecommunications network increases and as more and more features and communications formats are available to the subscribers of the network, the provision of presence information related to the subscribers, and the various formats that may be utilized by the subscribers for various communications, becomes increasingly complex.

Therefore, it would be desirable to provide an improved method and system for providing presence information related to a communications network that provides a variety of communications formats and services.

SUMMARY OF THE INVENTION

In accordance with an embodiment of a method of the present invention, a method for providing presence information related to a communications network is provided. The method includes receiving a first presence information message from a first network element of the communications network at a presence aggregator of the communications network, where the first network element utilizes a first communications protocol. A second presence information message is received from a second network element of the communications network at the presence aggregator, where the second network element utilizes a second communications protocol. The presence aggregator translates the first and second presence information messages into a standardized protocol and sends the translated first and second presence information messages to a presence server.

In accordance with an embodiment of a system of the present invention, the system includes the presence aggregator of the communications network. The presence aggregator receives the first presence information message from the first network element of the communications network and the second presence information message from the second network element. The presence aggregator translates the first and second presence information messages into a standardized protocol and sends the translated first and second presence information messages to a presence server coupled to the communications network.

DETAILED DESCRIPTION OF THE EXEMPLARY EMBODIMENTS

Figure 1:
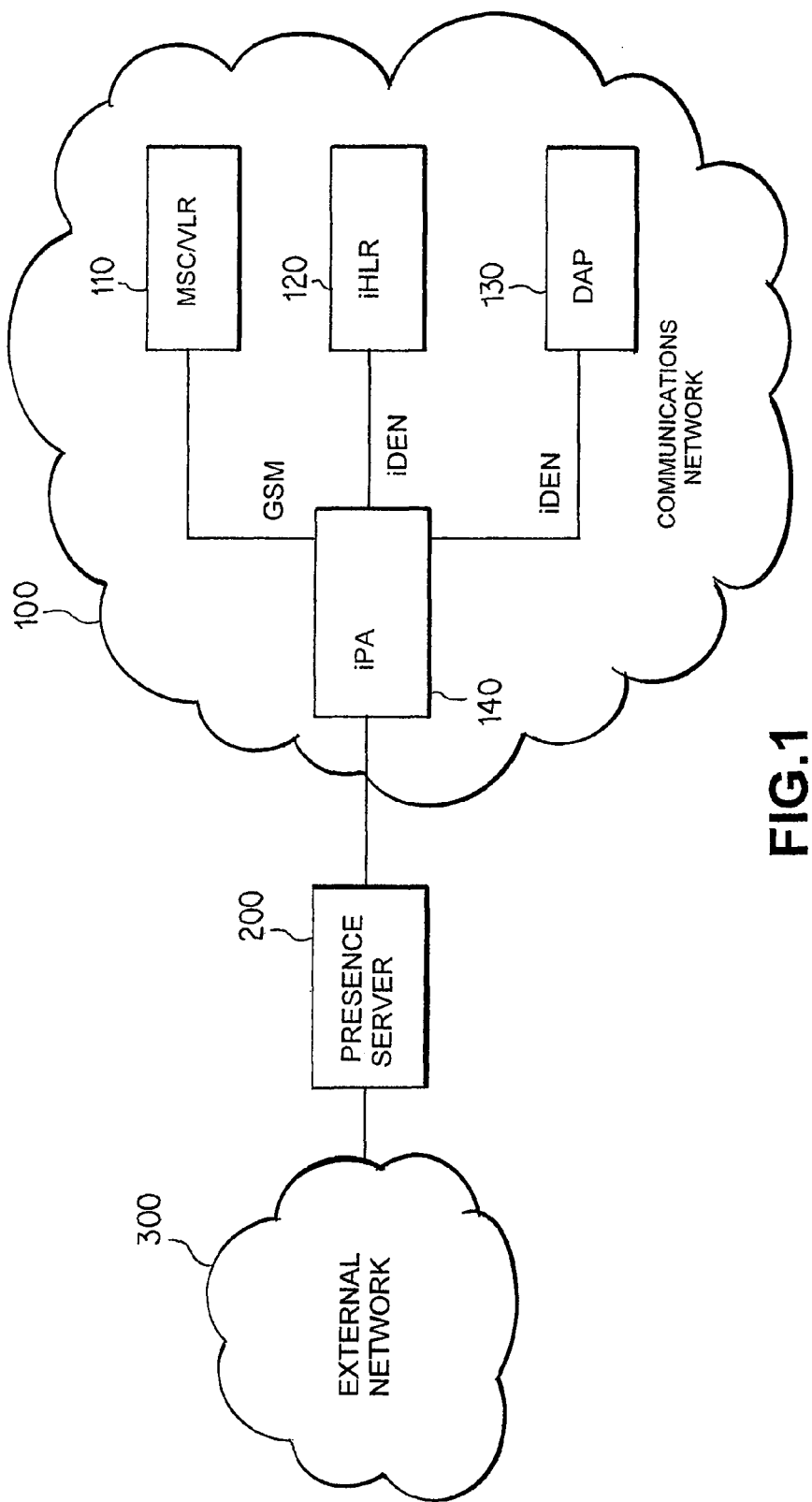
FIG. 1 illustrates an embodiment of a system for providing presence information related to a communications network in accordance with the principles of the present invention.

FIG. 1 illustrates an embodiment of an exemplary system for providing presence information related to a communications network 100. In the exemplary embodiment, the communications network 100 is the Integrated Digital Enhanced Network (iDEN) as provided by service provider Sprint Nextel and Motorola. The iDEN network 100 provides a variety of different types of communication services to subscribers of the network. Thus, the communications network may provide dispatch calling services, interconnect calling services, and data communications services. As is known, a dispatch call is a half-duplex call and is commonly known as a "walkie-talkie", or push-to-talk (PTT), type of call. As discussed above, iDEN communications network 100 may also provide interconnect calls, which are commonly known as regular cell phone calls. iDEN network 100 may also provide data services, such as text messages and internet applications.

In network 100, the various communications services are provided by various different network elements that utilize different respective protocols within the network. As such, interconnect voice services are provided by network elements that include, for example, a mobile switching center (MSC) and a Visitor Location Register (VLR). These elements, and the other elements required for providing interconnect services, are represented in FIG. 1 by functional element 110. These MSC and VLR network elements communicate with each other, and with other elements that provide these types of services, over a communications infrastructure within communications network 100 by using a first communications protocol, e.g., a Global System for Mobile Communications (GSM) protocol.

As discussed above, dispatch communications services are also provided by iDEN communications network 100. As such, in the exemplary embodiment, dispatch services utilize the iDEN protocol within network 100. For these dispatch services, as can be seen in FIG. 1 and as is known for the exemplary embodiment, network elements that provide dispatch services include an iDEN home location register (iHLR) 120 and dispatch application processors (DAP) 130. The iHLR, among other information, may be used to store information for network subscribers such as last known registered location, communication preferences, and access rights. Additionally, the iHLR may contain information related to group and fleet identifications and service provider policies and procedures. Typically, the iHLR serves the entire dispatch network or a substantial segment of the network and is a central repository for subscriber and network-related information. The DAP, as is known, generally coordinates and controls dispatch, packet data services, and IP services for subscribers to the network in a geographic region.

However, the present invention is not limited to any particular network elements or configuration for providing the various services within communications network 100. Additionally, the present invention is not limited to any particular type of presence information related to either the network elements or the subscribers of the network. Thus, the presence information can be related to the network elements themselves or the subscribers. The presence information messages may be provided in the respective protocols of the services that the messages relate to.

As will be further described below, in accordance with the principles of the present invention, an iDEN presence aggregator (iPA) 140 is provided in iDEN network 100 and acts as a presence source for providing presence information to a presence server. As such, iDEN presence aggregator 140 collects all of the various presence information related to the iDEN communications network 100 and the subscribers of the network. Thus, the iDEN presence aggregator 140 provides full presence information related to the iDEN network to a presence server.

The presence aggregator 140 may receive the presence information messages from the various network elements in a format related to the protocol associated with the respective network element. Thus, presence aggregator 140 may receive a presence information message from MSC/VLR 110 in a format associated with the GSM protocol. Similarly, presence aggregator 140 may receive presence messages from the iDEN home location register 120 and the iDEN DAP 130 in a format associated with the iDEN protocol. In any case, presently, the iDEN network does not utilize an open, standard interface for communication of presence information to external communications networks/devices. Thus, in accordance with the principles of the present invention, the presence aggregator collects the presence information from the iDEN network and translates the presence information into a standardized protocol. The present invention is not limited to any particular standardized protocol. Examples of such protocols are SIP for Instant Messaging and Presence Leveraging Extensions (SIMPLE) and Extensible Messaging and Presence Protocol (XMPP).

Further in accordance with the principles of the present invention, a presence server 200, which is external to iDEN network 100, is coupled to the presence aggregator 140 and receives the translated presence messages from the presence aggregator. As such, the presence aggregator 140 collects, translates, and sends all presence messages related to the iDEN network 100, and the subscribers thereof, to a presence server 200 that is coupled to the network 100. The presence server 200 then provides the translated presence messages to a network 300 that is also external to communications network 100. Additionally, in accordance with the principles of the present invention, the invention is not limited to any particular manner in which the translated presence messages are utilized or further communicated by the presence server 200. Thus, the presence server can provide the messages to a network and/or individual communication devices, e.g., mobile phones, personal computers, PDAs, etc.

As discussed above, various types of presence information may be provided by the presence aggregator for the iDEN network that may be of interest to a third party and/or an external network. The present invention is not limited to any particular type of presence information. All that is required is that the presence aggregator collect presence information from a variety of different sources from within the closed iDEN network and translate this presence information into a standardized, open protocol such that the presence information can be utilized by communications networks/devices that are external to the iDEN network. In this manner, full service presence information can be provided from the iDEN network related to dispatch, interconnect, and data services to external networks/devices.

Figure 2:
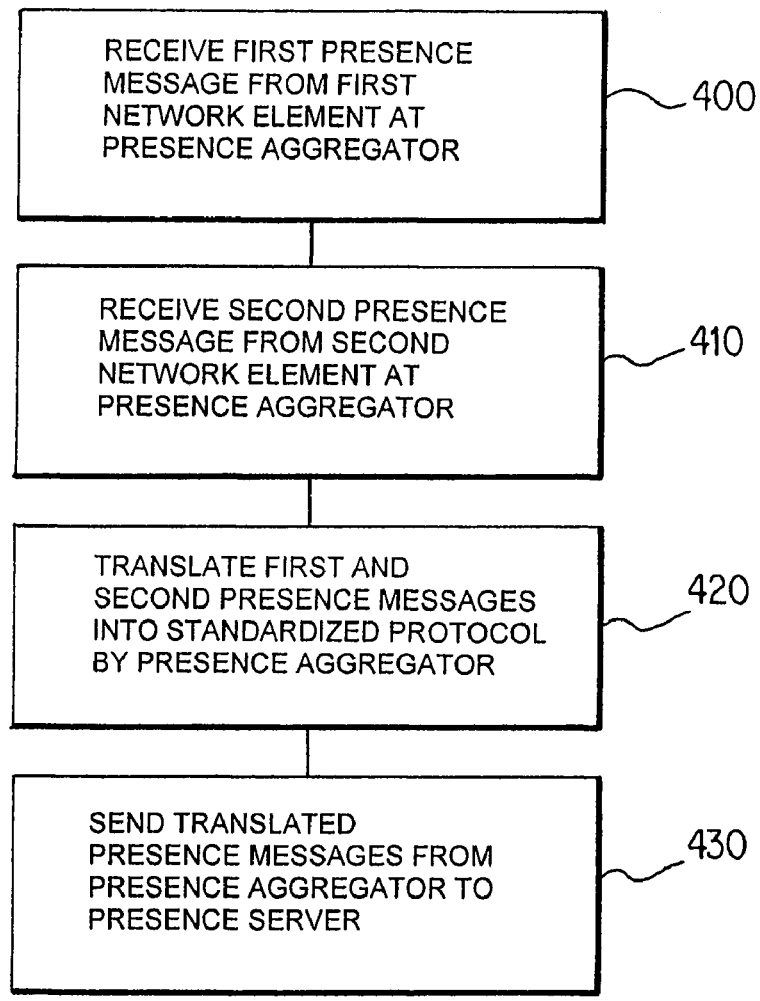
FIG. 2 illustrates an embodiment of a method for providing presence information related to a communications network in accordance with the principles of the present invention.

FIG. 2 illustrates an exemplary method of the present invention. As can be seen, in step 400 a first presence message is received from a first network element associated with the iDEN network at the presence aggregator. In step 410, a second presence message is received from a second network element associated with the iDEN network at the presence aggregator. As discussed previously, the first network element may be an MSC/VLR associated with interconnect services provided by the iDEN network and the second network element may be an iHLR and/or DAP associated with dispatch services provided by the iDEN network. In step 420 the presence aggregator translates the first and second presence messages into a standardized protocol. Of course, if the first and second presence messages are in different protocols/formats, the presence aggregator translates each of the messages into the standardized protocol. If both are in the same protocol/format, the presence aggregator is only required to translate both from the same protocol/format into the standardized protocol.

The present invention is not limited to any particular format or protocol for the iDEN presence messages. The presence aggregator collects all iDEN presence information from different iDEN network elements, translates it, and provides it to the presence server. This step is shown in FIG. 2 in step 430. As shown, the presence aggregator sends the translated presence messages to the presence server in a standardized protocol, e.g., SIMPLE or XMPP.

Further in accordance with the principles of the present invention, the presence aggregator is not limited to only one-for-one translating presence messages and sending the translated presence messages individually to the presence server. The presence aggregator can organize and consolidate presence messages from any individual network element such that further efficiencies can be obtained. For example, the presence aggregator can consolidate multiple translated presence messages from any one particular network element, or related to any particular network subscriber, and send the consolidated messages to the presence server in a single transmission. In this manner, separate transmissions are not required for each presence message. Further, the aggregator can consolidate multiple translated presence messages regarding any single particular presence parameter from multiple network elements, or subscribers, and send the consolidated messages to the presence server in a single transmission. For example, the presence aggregator can send a single transmission to the presence server that provides "on/off" presence information for multiple network elements.

Further, the presence aggregator maintains state information for each user of network 100. This state information may be related to whether the user is involved in a PTT call, a data session, and/or an interconnect call. The aggregator may determine this state information for the user from the presence messages it receives from the various network elements. The state information may include the present and past state information for the users. Thus, the aggregator is a central repository for state information related to users of the network. The aggregator can then send this state information to the presence server. As such, the presence aggregator, as discussed above and previously, is not merely a translator of presence messages, but rather is an aggregator of full presence information for the various different types of services, and use of those services by users, provided by a communications network. The state information maintained by the presence aggregator may also contain information regarding the state of the various network elements as well.

The present invention can include a central presence aggregator or a distributed architecture of multiple presence aggregators in the iDEN network. All that is required is that a presence aggregator receive presence messages from network elements of a communications network and provide presence messages to a presence server. Additionally, the presence information provided by the presence server is not required to be specifically provided to any one particular third party, network or application. The presence server provides the presence status to a communications medium such that this status is visible to any number of interested parties.

The disclosed embodiments are illustrative of the various ways in which the present invention may be practiced. Other embodiments can be implemented by those skilled in the art without departing from the spirit and scope of the present invention.

What is claimed is:

1. A method for providing presence information related to a communications network, comprising the steps of:
   receiving a first presence information message from a first network element of a first the communications network at a presence aggregator of the first communications network, wherein the first network element utilizes a first communications protocol;
   receiving a second presence information message from a second network element of the first communications network at the presence aggregator, wherein the second network element utilizes a second communications protocol;
   determining at the presence aggregator first state information about the first network element from the first presence information and second state information about the second network element from the second presence information message, wherein the presence aggregator maintains the first and second state information for the first and second network elements, respectively;
   translating the first and second presence information messages into a standardized communications protocol by the presence aggregator;
   consolidating the first state information, the second state information, the translated first presence information message and the translated second presence information message into a consolidated message; and
   sending the consolidated message to a presence server external to the first communications network, to provide the translated first and second presence information messages, the first state information and the second state information to a third network element of a second communications network.

2. The method of claim 1, wherein the communications network is an Integrated Digital Enhanced Network (iDEN) that includes a dispatch call network and an interconnect call network.

3. The method of claim 2, wherein the first network element is an iDEN dispatch application processor (DAP) of the dispatch call network.

4. The method of claim 2, wherein the first network element is an iDEN home location register (iHLR) of the dispatch call network.

5. The method of claim 2, further comprising the step of receiving a third presence information message from a third network element of the communications network at the presence aggregator of the communications network, wherein the third network element utilizes a third communications protocol and wherein the third network element is a mobile switching center of the interconnect call network.

6. The method of claim 2, wherein the dispatch call network utilizes a proprietary protocol.

7. The method of claim 2, wherein the interconnect call network utilizes a Global System for Mobile Communications (GSM) protocol.

8. The method of claim 1, wherein the standardized protocol is a SIP for Instant Messaging and Presence Leveraging Extensions (SIMPLE) protocol.

9. The method of claim 1, wherein the standardized protocol is an Extensible Messaging and Presence Protocol (XMPP) protocol.

10. The method of claim 9:
    wherein the first presence information message from the first network element of the communications network is associated with a Global System for Mobile Communications (GSM) protocol;
    wherein the second presence information message from the second network element of the communications network is associated with an Integrated Digital Enhanced Network (iDEN) protocol;
    and wherein the presence aggregator translates the first and second presence information messages from their respective protocols into the standardized protocol.

11. A system for providing presence information related to a first communications network, comprising:
    a presence aggregator of the first communications network;
    wherein the presence aggregator receives a first presence information message from a first network element of the first communications network and wherein the first network element utilizes a first communications protocol;
    wherein the presence aggregator receives a second presence information message from a second network element of the first communications network and wherein the second network element utilizes a second communications protocol;
    wherein the presence aggregator determines first state information about the first network element from the first presence information and second state information about the second network element from the second presence information message;
    wherein the presence aggregator maintains the first and second state information for the first and second network elements, respectively;
    wherein the presence aggregator translates the first and second presence information messages into a standardized communications protocol; and
    wherein the presence aggregator consolidates the first state information, the second state information, the translated first presence information message and the translated second presence information message into a consolidated message; and
    a presence server external to the first communications network and coupled to the communications network, wherein the presence aggregator sends the consolidated message to the presence server, to provide the translated first and second presence information messages, the first state information and the second state information to a third network element of a second communications network.

12. The system of claim 11, wherein the communications network is an Integrated Digital Enhanced Network (iDEN) that includes a dispatch call network and an interconnect call network.

13. The system of claim 12, wherein the first network element is an iDEN dispatch application processor (DAP) of the dispatch call network.

14. The system of claim 12, wherein the first network element is an iDEN home location register (iHLR) of the dispatch call network.

15. The system of claim 12, wherein the presence aggregator receives a third presence information message from a third network element of the communications network and wherein the third network element utilizes a third communications protocol, and further wherein the third network element is a mobile switching center of the interconnect call network.

16. The system of claim 12, wherein the dispatch call network utilizes a proprietary protocol.

17. The system of claim 12, wherein the interconnect call network utilizes a Global System for Mobile Communications (GSM) protocol.

18. The system of claim 11, wherein the standardized protocol is a SIP for Instant Messaging and Presence Leveraging Extensions (SIMPLE) protocol.

19. The system of claim 11, wherein the standardized protocol is an Extensible Messaging and Presence Protocol (XMPP) protocol.

20. The system of claim 19:
wherein the first presence information message from the first network element of the communications network is associated with a Global System for Mobile Communications (GSM) protocol;
wherein the second presence information message from the second network element of the communications network is associated with an Integrated Digital Enhanced Network (iDEN) protocol;
and wherein the presence aggregator translates the first and second presence information messages from their respective protocols into the standardized protocol.

21. An Integrated Digital Enhanced Network (iDEN), comprising:
a first network element associated with an interconnect service provided by the iDEN network;
a second network element associated with a dispatch service provided by the iDEN network; and
a presence aggregator within the iDEN network, wherein the presence aggregator is coupled to a presence server that is external to the iDEN network;
wherein the presence aggregator receives a first presence information message from the first network element;
wherein the presence aggregator receives a second presence information message from the second network element;
wherein the presence aggregator determines first state information about the first network element from the first presence information and second state information about the second network element from the second presence information message;
wherein the presence aggregator maintains the first and second state information for the first and second network elements, respectively;
wherein the presence aggregator translates the first and second presence information messages into a standardized communications protocol, consolidates the first state information, the second state information, the translated first presence information message and the translated second presence information message into a consolidated message, and sends the consolidated message to the presence server, to provide the translated first and second presence information messages, the first state information and the second state information to a third network element of a second communications network.

* * * * *